United States Patent [19]

Koyama

[11] 3,718,741
[45] Feb. 27, 1973

[54] N-1 AND N-2 FRACTIONS OF NEOCARZIONSTATIN

[75] Inventor: Yasuo Koyama, Tokyo, Japan

[73] Assignee: Kayaku Antibiotic Research Company, Ltd., Tokyo, Japan

[22] Filed: July 21, 1970

[21] Appl. No.: 56,874

[30] Foreign Application Priority Data

July 24, 1969  Japan ................................. 44/58518

[52] U.S. Cl. .................................. 424/118, 424/124

[51] Int. Cl. ................................................ A61k 21/00

[58] Field of Search ............................ 424/118, 124

[56] References Cited

UNITED STATES PATENTS 3,334,022   8/1967   Ishida et al. ........................... 424/116

OTHER PUBLICATIONS

Kitame et al., J. of Antibiotics, July, 1968, pages 460–462

Primary Examiner—Jerome D. Goldberg
Attorney—Oblon, Fisher & Spivak

[57] ABSTRACT

A process of producing an antibiotic substance which comprises fractionating neocarzinostatin by passing an aqueous solution of said material through an ion exchange chromatography column or by electrophoresis and thereafter recovering at least one fraction characterized by a molecular weight of at least 9,000.

2 Claims, 6 Drawing Figures

ULTRAVIOLET ABSORPTION SPECTRA OF THE FRACTIONS N-1 AND N-2 OF NEOCARZINOSTATIN

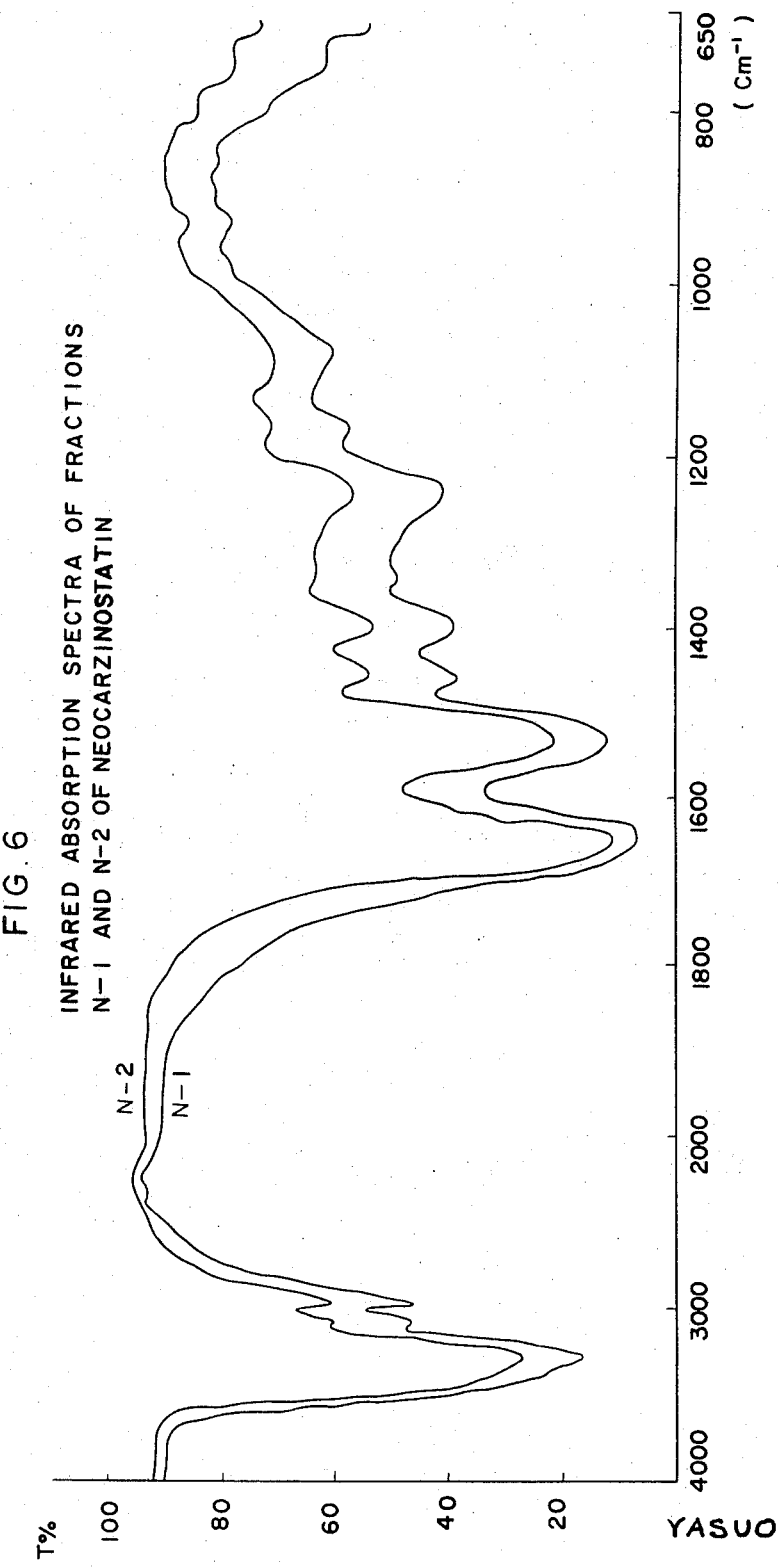

N-1 AND N-2 FRACTIONS OF NEOCARZIONSTATIN

BACKGROUND OF THE INVENTION

1. Field of Invention

The present invention relates to a process of separating and collecting active fractions of neocarzinostatin which are characterized by good antibiotic properties. More particularly, the present invention relates to a process of fractionating crude neocarzinostatin obtained by culturing a neocarzinostaticus producing strain of Streptomyces into two fractions designated N-1 and N-2 which are separated and collected.

2. Description of the Prior Art

U.S. Pat. No. 3,334,022, disclosed the accumulation of neocarzinostatin as a macromolecular carzinostatin substance in a culture material of *Streptomyces carzinostaticus var. neocarzinostaticus*.

However, it has now been found that the neocarzinostatic obtained by that patent is in the form of a complex and if it is further refined, two purified fractions, termed herein N-1 and N-2, can be obtained.

SUMMARY OF THE INVENTION

Accordingly, one object of the present invention is to provide a process of separating and collecting an active fraction of neocarzinostatin.

Another object of the present invention is to provide a process of separating and collecting fractions termed N-1 and N-2 of neocarzinostatin which are characterized by antibiotic activity.

A further object of the present invention is to provide the fractions N-1 and N-2 of neocarzinostatin.

These and other objects have now herein been attained by culturing *Streptomyces carzinostaticus var. neocarzinostaticus* ATCC No. 15945 and No. 15944 according to the process of U.S. Pat. No. 3,334,022, collecting the crude neocarzinostatin and thereafter refining the neocarzinostatin to form N-1 and N-2 fractions.

DETAILED DESCRIPTION OF PREFERRED EMBODIMENTS

Figure 1:
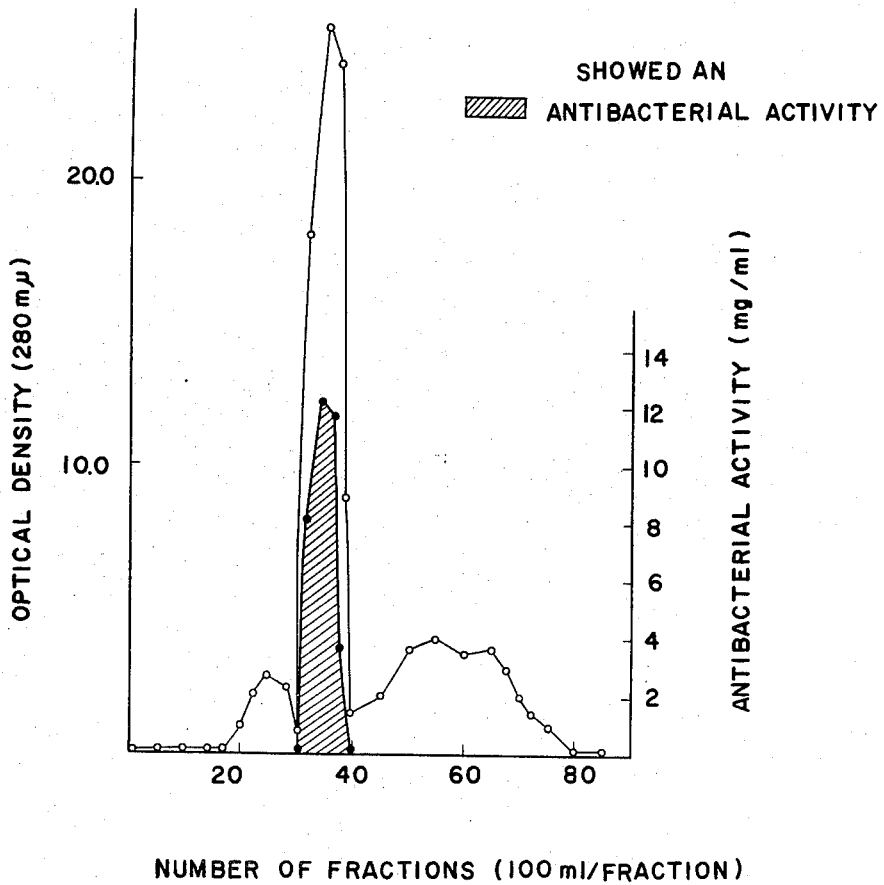
FIG. 1 shows an elution pattern obtained by gel-filtering crude neocarzinostatin with Sephadex G-50.

The culture used in the present invention is prepared by ordinary state of the art techniques. A variety of materials can be used in the culture medium as the nutritive source although preferably materials containing a source of nitrogen such as peptone, meat extract, yeast, corn steep liquor, soybean meal, peanut meal, protein hydrolates, inorganic nitrate, ammonium sulfate or the like are used. A carbon source should also be present, such as dextrose, lactose, maltose, starch, glycerine, molasses or the like and should be used in comparatively large quantities. Various inorganic salts, assistants and the like can also be added, if desirable. In order to provide a liquid culture medium having the above-described nutritive substances on a large scale, it is advantageous to use a submerged aerated culture. The culture temperature should be about 25° to 30°C., and preferably around 27° to 28°C. The pH of the culture should be about 6 to 7, and should preferably be approximately pH 7.

A series of neocarzinostaticus producing strains of streptomyces was cultured while agitating for 2 – 5 days at 28°C. in a sterile media having a pH of 7.2. The medium contained a meat extract, peptone, sodium chloride and calcium carbonate. Each culture differed only in the type of carbon source, e.g., glycerine, dextrose, lactose, sucrose, maltose, starch and the like. It was found that the medium containing dextrose as the carbon source was found to be the most stable and showed the highest rate of neocarzinostatin production. The addition of starch to the medium was found to be useful for increasing the productivity of the culture.

Also, it was found that a culture medium containing starch, sodium chloride, inorganic salts, yeast extract and soybean and meal provided an excellent growth of organism.

When the fermentation was carried out at 28°C. with agitation, a pH of 7.2, 3% meat extract, 0.5% casaminic acid, 0.5% sodium chloride, and 0.2% calcium carbonate, the pH of the medium dropped to 6.6 – 6.0 after 24 hours, and then rose again to 6.8 – 7.2 in the following 48 – 72 hours. The culture filtrate obtained was found to inhibit the growth of *Sarcina lutea* even when diluted 1,000 percent. When the filtrate was added to Hela cells, a degenerative toxic figure was indicated at a 1,200 percent dilution.

To recover neocarzinostatin, the culture broth was separated by conventional methods such as centrifugal action or similar methods so as to form a liquid phase and a solid phase containing the mycelium. Neocarzinostatin is largely contained in the liquid phase.

In order to separate crude neocarzinostatin obtained in the culture filtrate, one of several methods can be used. For example, precipitation techniques can be used whereby saturated ammonium sulfate, saturated sodium sulfate or zinc chloride is added to a concentrate of the culture filtrate. Another precipitation technique involves adjusting the pH to a value of 3.5 – 4.0 until precipitation occurs. Still another suitable precipitation method involves adding an organic solvent mixed with water to effect precipitation, such as methanol, ethanol, acetone and the like. Another technique involves adjusting the pH of the solution and using an absorbent such as kaolin, celite or the like which acts to adsorb the impurities in preference to the neocarzinostatin.

A crude neocarzinostatin can thus be obtained by filtering or by use of a centrifugal force or by adding a filter assistance such as diatomaceous earth. The crude neocarzinostatin is dissolved in water, dialyzed with the aid of a semipermeable membrane such as cellophane, and thereafter purified by removing impurities such as ammonium sulfate and low molecular weight substances. Neocarzinostatin can also be separated by suitable fractionating with the use of a gel-filtering agent such as Sephadex G-25, G-50 and G-75.

The object of the present invention is to separate the thus collected crude neocarzinostatin into active fractions by ion-exchange chromatography, electrophoresis, or by a combination of these techniques so as to separate the collect N-1 and N-2 fractions which are characterized by carcinostatic properties. It is preferable to separate the purified N-1 and N-2 fractions with the use of column chromatography using carboxymethylcellulose ion-exchange material. In this technique, an aqueous solution of the crude neocarzinostatin is poured into a carboxymethylcellulose containing column and eluted stepwise with a buffer solution. Using this technique, N-1 and N-2 fractions can be collected in a highly purified form containing little or no high molecular impurities. Next, the organic salts or inorganic substances used in the buffer solution are dialyzed by a gel-filtering method or with a semipermeable membrane, so that highly purified N-1 and N-2 fractions can be obtained. The fractions can than be finally purified by the use of carboxymethylcellulose (CMC), an ion-exchange cellulose such as aminoethyl (AE) cellulose, diethyl aminoethyl (DATE) cellulose, or an ion-exchange Sephadex such as CM-Sephadex, DEATE-Sephadex, or the like.

The N-1 and N-2 fractions of neocarzinostatin obtained by the above described methods are substantially free of major impurities and have a negligible ash content.

These fractions show a symmetrical pattern in column chromatography using Sephadex and CMC, and are homogeneous when prepared by polyacrylamide gel electrophoresis, electrofocusing ultracentrifugation of paper electrophoresis.

The physical and chemical properties of the N-1 and N-2 fractions of the antibiotic neocarzinostatin thus obtained are as follows: (Table 1)

TABLE 1 — PROPERTIES OF N-1 AND N-2 FRACTIONS

Figure 5:
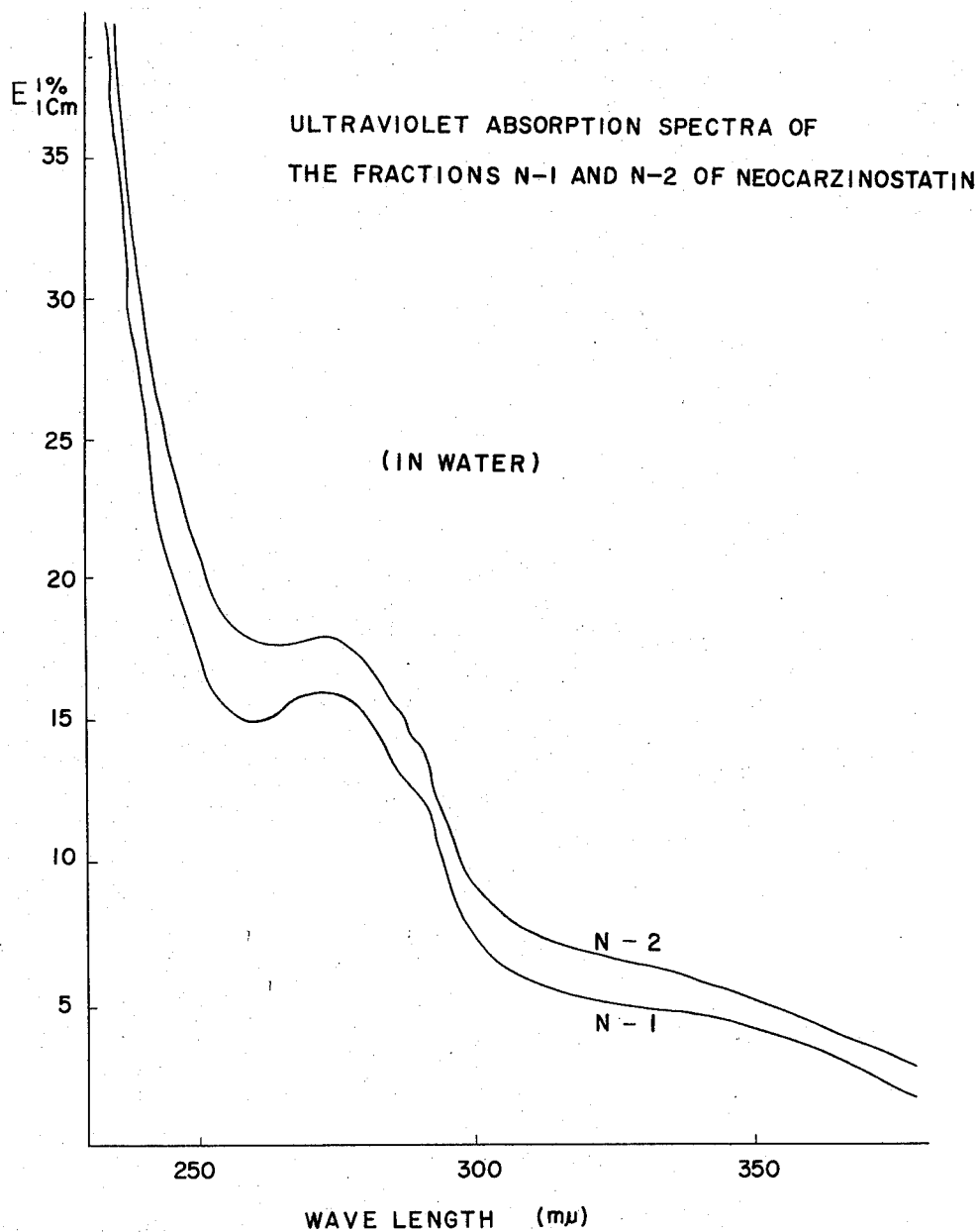
FIG. 5 shows an ultraviolet absorption spectra of the N-1 and N-2 fractions of purified neocarzinostatin; and, FIG. 6 shows an infrared spectra of N-1 and N-2 fractions of purified neocarzinostatin.

|  |  | N-1 | N-2 |
|---|---|---|---|
| Properties |  | white,acidic amorphous powder | white,acidic amorphous powder |
| Molecular Weight |  | 9,300 | 9,000 |
| Decomposition Point |  | 260°C. | 260°C. |
| Analysis Value (%) | carbon | 46.94 | 46.23 |
|  | hydrogen | 7.21 | 7.58 |
|  | nitrogen | 14.24 | 13.82 |
| Isoelectric Point |  | 3.26 | 3.36 |
| Ultraviolet absorption spectrum |  | FIG. 5 | |
| Infrared spectrum |  | FIG. 6 | |

| Color reaction | biuret reaction,folin reaction,phenol reaction, peptide reaction,ninhydrin reaction(positive) |
|---|---|
|  | Molisch reaction,anthrone reaction,orcinol reaction, Elson-Morgan reaction,ferric chloride reaction (negative) |
| Susceptibility to enzyme: | |
| trypsin | resisted |
| chymotrypsin | resisted |
| pronase | resisted |

When the N-1 and N-2 fractions of neocarzinostatin are hydrolyzed in a sealed tube of 6N hydrochloric acid at 110°C. for 24 hours and 110°C. for 48 hours, respectively, an amino acid is formed as indicated in Table 2.

TABLE 2 — AMINOACID COMPOSITION OF N-1 AND N-2 FRACTIONS (AUTOMATIC ANALYSIS OF AMINOACID)

| Aminoacid | Number of Aminoacid Residues | |
|---|---|---|
|  | N-1 | N-2 |
| leucine | 1 | 1 |
| histidine | 0 | 0 |
| ammonia | 4 | 6 |
| arginine | 2 (3) | 2 |
| cysteic acid | 0 | 0 |
| aspartic acid | 10 | 10 |
| threonine | 11 | 10 |
| serine | 9 | 8 |
| glutamic acid | 4 | 4 |
| proline | 4 | 3 |
| glycine | 13 (14) | 13 |
| alanine | 16 | 15 |
| ½ cysteine | 4 | 4 |
| valine | 10 | 10 |
| methionine | 0 | 0 |
| isoleucine | 1 | 1 |
| leucine | 5 | 5 (6) |
| tyrosine | 1 | 1 |
| phenylalanine | 4 | 4 |
| tryptophane | 1 | 1 |
| TOTAL | 97 | 92 |

The stability of the N-1 and N-2 fractions of neocarzinostatin is as shown in the following Table. The stability test was carried out as follows: A solution of the N-1 and N-2 fractions of neocarzinostatin was adjusted to a pH of 3.0, 7.0 and 9.0, and heated to 37°C. and then 60°C. The residual activity after 1 hour, 2 hours, and 3 hours was examined and antibacterial activity toward *Sarcina lutea*. The residual activities thus obtained are represented in the following Table:

|  | pH 3.0 | | | pH 7.0 | | | pH 9.0 | | |
|---|---|---|---|---|---|---|---|---|---|
| Hours | 1 | 2 | 3 | 1 | 2 | 3 | 1 | 2 | 3 |
| Temperature: | | | | | | | | | |
| 37° C.: | | | | | | | | | |
| N-1 | 100 | 100 | 100 | 75 | 72 | 70 | 55 | 40 | 30 |
| N-2 | 62 | 60 | 57 | 100 | 100 | 100 | 75 | 65 | 55 |
| 60° C.: | | | | | | | | | |
| N-1 | 60 | 30 | 0 | 0 | 0 | 0 | 0 | 0 | 0 |
| N-2 | 55 | 0 | 0 | 20 | 0 | 0 | 0 | 0 | 0 | the N-1 and n-2 fractions of neocarzinostatin show the following biological properties.

1. Antimicrobial activities:

The antimicrobial activity of the present substances are as shown in Table 3, which shows growth inhibition to some types of Gram positive bacteria and a mutant of *Shigella* species. It further shows a high activity toward *Mycoplasma*.

TABLE 3 — ANTIMICROBIAL ACTIVITY OF N-1 AND N-2 FRACTIONS OF NEOCARZINOSTATIN

| Bacteria to be Tested | Minimum Inhibitory concentration (mcg/ml) | |
| --- | --- | --- |
| | N-1 | N-2 |
| Staphylococcus aureus 209p | 10.0 | 10.0 |
| Staphylococcus aureus Terashima | 20.0 | 20.0 |
| Sarcina lutea | 0.3 | 0.2 |
| Bacillus subtilis PCI 219 | 4.0 | 3.0 |
| Escherichia coli NJHJ | >1000 | >1000 |
| Shigella flexneri 2a | >1000 | >1000 |
| Shigella flexneri 2a-11 | 0.05 | 0.025 |
| Shigella sonnei | >1000 | >1000 |
| Salmonella typhi | >1000 | >1000 |
| Vibrio comma | >1000 | >1000 |
| Proteus mirabilis | >1000 | >1000 |
| Xanthomonas oryzae | >1000 | >1000 |
| Mycobacterium tuberculosis 607 | >1000 | >1000 |
| Candida albicans m-9 | >1000 | >1000 |
| Mycoplasma pneumoniae Mac. | 1.0 | 1.0 |
| Mycoplasma gallisepticum | 2.0 | 2.0 |
| Mycoplasma pulmonis MA | 0.5 | 0.5 |

2. Action toward Hela cells:

Both N-1 and N-2 fractions prevent the increase of Hela $S_3$ cells at a concentration of 0.1 mcg/ml and cause degeneration of the cells.

3. Animal toxicity:

The maximum tolerable dose of N-1 is 1.5 mg/kg and that of N-2 is 1.0 mg/kg when they are administered intraperitoneally to mice once daily for 7 days continuously. Moreover, at a single does, the maximum tolerable dose of the N-1 fraction is 6 mg/kg and that of the N-2 fraction is 5 mg/kg.

4. Anti-sarcoma 180 activity toward animal tumors:

The anti-tumor action is shown on the following experiments with mice.

The N-1 and N-2 fractions were administered to mice whose abdominal cavities were transplanted with 400,000,000 cells of Sarcoma 180, once daily for a continuous period of 6 days. After 24 to 48 hours from the start of transplantation, the fractions showed no toxicity to the tumor-bearing mice within the broad dose range of 1.0 to 0.05 mg/kg. the fractions were found to inhibit the retention of ascites, and to prolong the life span of the mice. For instance, dosages of 1.0, 0.3 and 0.1 mg/kg were tested and all of the mice treated were found to respond favorably and survived; that is, the chemotherapeutic index of the fractions was quite high. The effective range of daily administration is 20 mg/kg and acute toxicity was notice at 10 mg/kg, so that the ratio of the minimum effective dose in order to prolong the life span of the tumor-bearing mice was 200.

Moreover, the N-1 and N-2 fractions were found to be effective at concentrations of 1.0 to 0.7 mg/kg for prolonging the life span of mice having leukemia SN-36.

The effect of the N-1 and N-2 fractions against the above-described types of tumors has been tested by a culture filtrate and confirmed by purification. By examining the inhibitory activity against *Sarcina lutea* as a test organism, an analogy can be made between the purification of the active substance and its tumor-inhibiting effects.

5. Hemolytic action:

The N-1 and N-2 fractions showed no hemolytic action to 5 percent blood cells when tested on rabbits, rats, and sheep, even at the concentrations of 1,000 mcg/ml.

The above-described properties of the N-1 and N-2 fractions of neocarzinostatin indicate that they are novel substances.

Having generally described the invention, a more complete understanding can be obtained by reference to the following examples which are presented herein for purposes of illustration only and are not intended to be limiting in any manner.

In the following examples, the N-1 and N-2 fractions of neocarzinostatin are highly purified by means of a combination of a single collecting process.

EXAMPLE 1

Production of crude neocarzinostatin:

a. 100l of a culture medium (pH 7.2) having a composition of 3% dextrose, 0.5% meat extract, 5% casaminic acid, 0.5% sodium chloride, and 0.2% precipitated calcium carbonate was prepared in a 200l culture vessel, heated and sterilized at 120°C. for 30 minutes. A 0.5% volume of a seed culture of *Streptomyces carzinostaticus* var. *neocarzinostaticus* previously cultured in a culture medium having the same composition for 20 hours was antiseptically innoculated. An aerobic was added to 300 l/mm and the culture agitated at 180 r.p.m. with an inner pressure of 1 kg/cm². The temperature was 27°C. If foaming is excessive, an antifoaming agent may optionally be added. After 12 hours from starting the culture, antibacterial activity was noted in the culture broth and reached a maximum after 40 hours (anti-tumor activity against mouse ascites tumor run parallel to the antibacterial activity). The pH of the culture medium by this time was 7.2. The culture was stopped after 40 hours, filtered through a filter press, and solids such as mycelium were removed to obtain 80l of a culture filtrate. this culture filtrate inhibited the growth of *Sarcina lutea* when diluted 1,000 times, and inhibited the mitosis of Hela cells when diluted 1,200 times. It also inhibited the growth of Sarcoma 180 ascites tumor when diluted 500 times. The culture filtrate contained 350 mcg/ml of the N-1 fraction and 120 mcg/ml of the N-2 fraction.

b. The culture filtrate obtained by (a) was adjusted to a pH of 3.5 with the aid of a saturated oxalic acid solution, and the precipitate thus produced was filtered and removed. The thus obtained filtrate was added to an equivalent mixture of kaolin and Celite so as to make a 1 percent volume. The filtrate was stirred at 4°C. for 15 minutes. Chromoprotein, an impurity in the filtrate, was immediately adsorbed and filtered. The thus obtained filtrate was precipitated with 65% (v/w) saturated ammonium sulfate for 20 hours and centrifugally collected at 10,000 r.p.m for 20 minutes. To this precipitate was added 0.7l of water to form an aqueous solution, which was poured into a cellophane tube and dialyzed against pure water at 4°C. for 24 hours to remove ammonium sulfate and other low molecular impurities. The filtrate was frozen and dried and 70 g of crude neocarzinostatin powder characterized by a pale yellow brown color was obtained. The activity yield according to this operation was 96 percent and the powder obtained was found to inhibit the growth of *Sarcina lutea* at a concentration of 0.7 mcg/ml and to completely inhibit Sarcoma 180 ascites tumor of mice at a daily dose rate of 0.07 mg/kg over a period of 6 days.

c. 20 g. of crude neocarzinostatin powder characterized by a pale yellow brown color was dissolved in 500 ml of pure water. Insoluble matter was removed by centrifugal force and the supernatant liquid was gel-filtered with Sephadex G-50. 5.6l of Sephadex G-50, 5.6l of Sephadex G-50, buffered with 0.01 mole of acetic acid, was poured into a glass chromatographic column having a 7 × 90 cm.bore. 0.8l of the buffer solution was also added to the column. The liquid was continuously fractionated. By measuring the optical density at 280 m$\mu$ (reflecting the amount of protein) and by using the antibacterial activity against *Sarcina lutea* as a marker of the anti-tumor activity of each fraction, the elution pattern shown in FIG. 1 was obtained. The active fractions were collected, frozen and dried, so as to obtain 10 g of white neocarzinostatin complex. The active yield from the culture filtrate from this process was about 60 percent. This powder inhibited the growth of *Sarcina lutea* at a concentration of 0.5 mcg/ml. The minimum effective dose against Sarcoma 180 ascites tumor of mice was 0.05 mg/kg/day.

EXAMPLE 2

Figure 2:
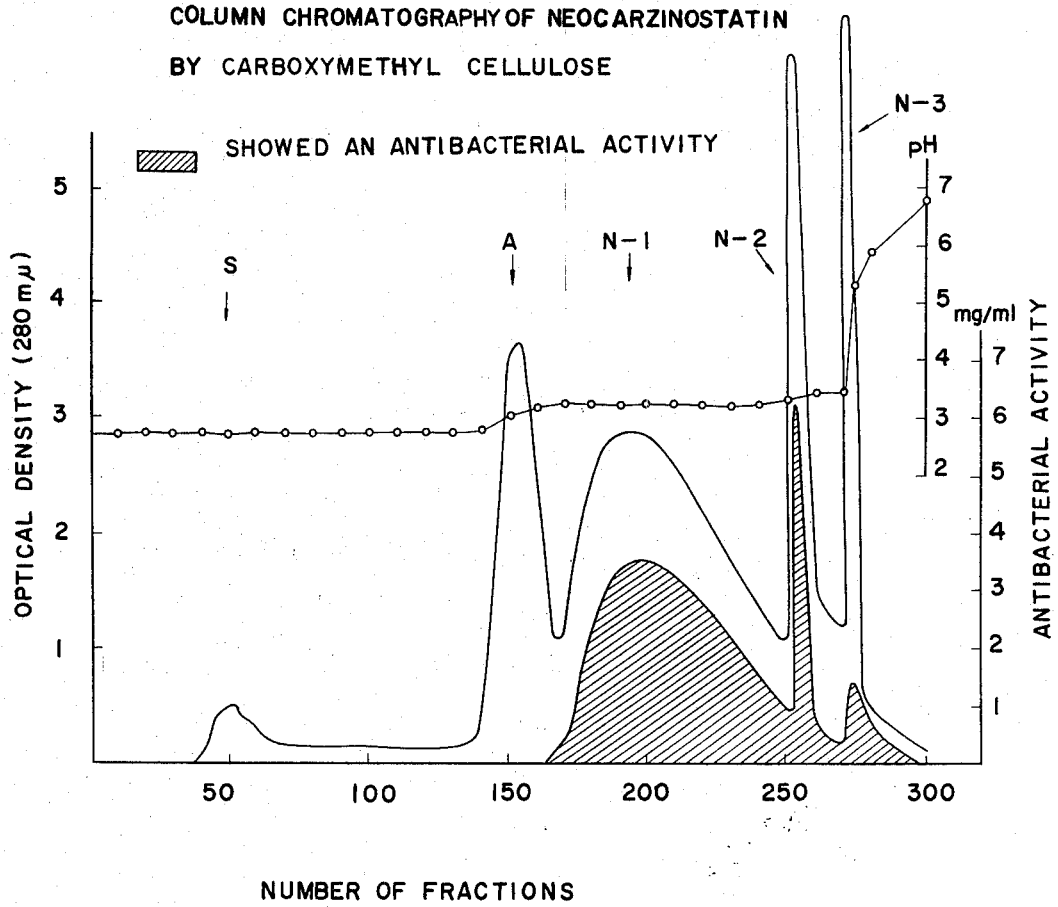
FIG. 2 shows an elution pattern obtained by refining neocarzinostatin according to a process of step-wise pH elution with the use of a column chromatography using a carboxymethylcellulose ion exchange material.
Figure 3:
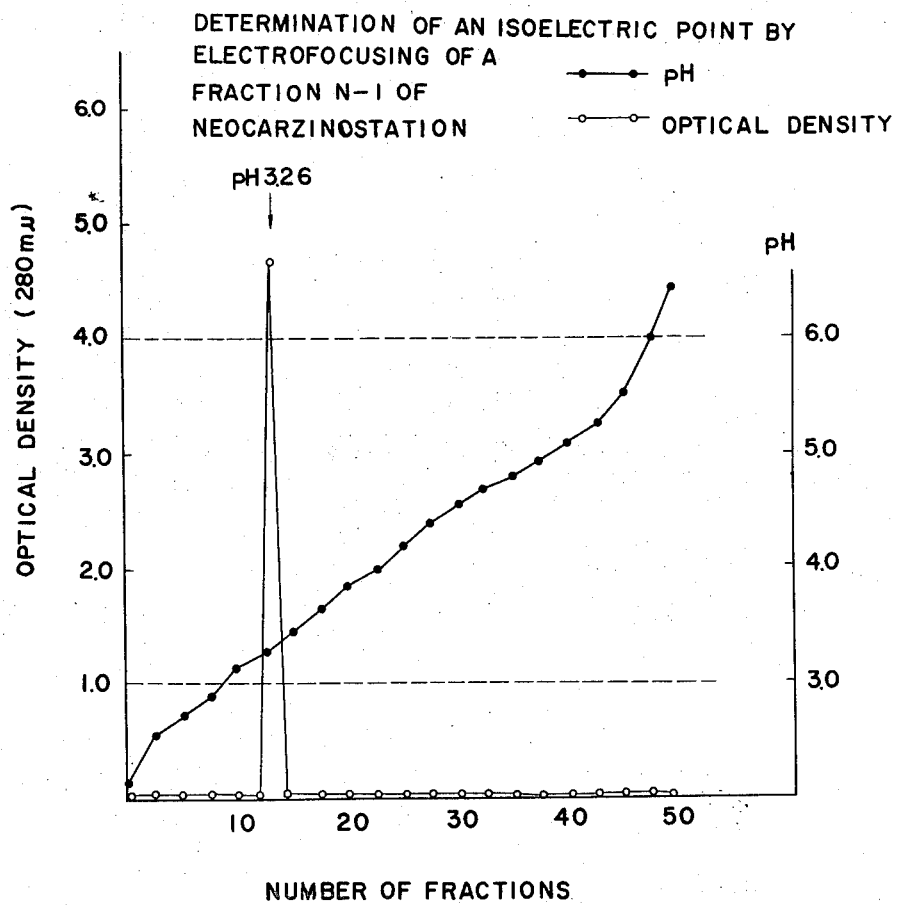
FIG. 3 shows a pattern of an isoelectric point by electrofocusing an N-1 fraction of neocarzinostatin.
Figure 4:
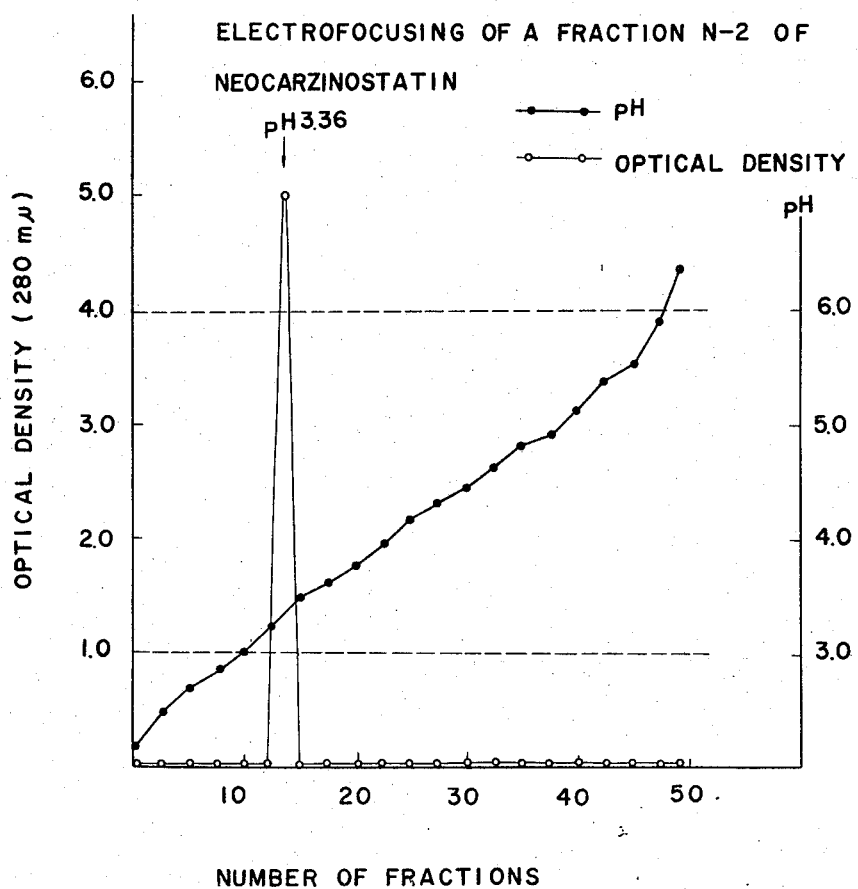
FIG. 4 shows a pattern of an isoelectric point by electrofocusing at N-2 fraction of neocarzinostatin.

Separation of the N-1 and N-2 fractions:

In order to separate and collect the N-1 and N-2 fractions from the white neocarzinostatin complex obtained in Example 1, ion exchange chromatography was carried out with the use of carboxymethylcellulose. That is, carboxymethylcellulose fully buffered with a 0.1M acetic acid buffer solution having a ph of 2.8 was poured into a chromatographic column measuring 45 cm × 140 cm. 15 l of the buffer solution was further added to the column and equilibrated. A concentrate solution of 10 g of neocarzinostatin complex dissolved in 10 ml of water was added to the column and adsorbed. This was eluted with a 0.1M acetic acid buffer solution by raising the pH to 2.8, 3.2 and 3.4, stepwise. After each addition, 20 ml. of the solution was fractionated. By measuring the optical density at 280 m$\mu$ and the antibacterial activity against *Sarcina lutea* of each eluted fraction, an elution image as shown in FIG. 2 was obtained. As shown in FIG 2, the neocarzinostatin complex was fractionated into five fraction, designated S, A, N-1, N-2 and N-3. Each fraction was collected and dialyzed against distilled water at 4°C. for 24 hours and the inner solution was frozen and dried. The fraction S was characterized as a pale yellow brown powder. Fractions A, N-1, N-2, and N-3 were characterized as white powders. The yield of fraction S was 2.105 g; the yield of fraction A was 1.532 g; of fraction N-1 was 2.495 g; of fraction N-2 was 0.8 g; and fraction N-3 was 0.255 g. Only fractions N-1, N-2 and N-3 were found to have carcinostatic activity. The inhibitory concentration against *Sarcina lutea* was used as an index of biological activity and was found to be 0.3 mcg/ml for N-1, 0.2 mcg/ml for N-2, and 1.0 mcg/ml for N-3, respectively.

The minimum effective concentration against Sarcoma 180 ascites tumor of mice was 0.03 mcg/kg/day for N-1, 0.02 mcg/kg/day for N-2, and 0.1 mcg/kg/day for N-3, respectively. The fractions A, N-1 and N-2 were found to be relatively homogeneous from the viewpoint of physiochemical properties, but the fraction N-3 was found to contain some protein impurities. Further, the fraction S is a kind of polysaccharide and the fraction A is an acidic protein.

With regard to the stability of neocarzinostatin, the above purification operation is carried out at a low temperature of less than 10°C.

Having fully described the invention, it will be apparent to one of ordinary skill in the art that many changes and modifications can be made without departing from the spirit or scope of the invention. Accordingly,

What is claimed and desired to be secured by Letters Patent of the United States is:

1. A first fraction of neocarzinostatin characterized by a molecular weight of 9,300, an amino acid number of 97 an isoelectric point of 3.26 and ultraviolet absorption peaks at 275, 290 and 350 m$\mu$ and having an elemental analysis of C : 46.94, H : 7.21 and N : 14.24 further being characterized by the approximate infrared spectrum as shown in FIG. 6.

2. A second fraction of neocarzinostatin characterized by a molecular weight of 9,000, an amino acid number of 92 an isoelectric point of 3.36, and having an elemental analysis of C : 46.23, H : 7.58 and N : 13.82 further being characterized by the approximate infrared spectrum as shown in FIG. 6.

* * * * *